(12) United States Patent
Zakharov (10) Patent No.: US 10,594,875 B2
(45) Date of Patent: Mar. 17, 2020

(54) USER INTERFACE FOR PRESENTING DEVICE METRICS

(71) Applicant: KYOCERA Document Solutions Inc., Osaka (JP)

(72) Inventor: Oleg Y. Zakharov, Walnut Creek, CA (US)

(73) Assignee: KYOCERA DOCUMENT SOLUTIONS INC., Osaka (JP)

(*) Notice: Subject to any disclaimer, the term of this patent is extended or adjusted under 35 U.S.C. 154(b) by 329 days.

(21) Appl. No.: 15/828,891

(22) Filed: Dec. 1, 2017

(65) Prior Publication Data

US 2018/0084117 A1 Mar. 22, 2018

Related U.S. Application Data

(62) Division of application No. 14/634,744, filed on Feb. 28, 2015, now Pat. No. 9,838,548.

(51) Int. Cl.
*H04N 1/00* (2006.01)
*G06T 11/20* (2006.01)

(52) U.S. Cl.
CPC ........ *H04N 1/00029* (2013.01); *G06T 11/206* (2013.01); *H04N 1/00034* (2013.01); *H04N 1/00039* (2013.01); *H04N 1/00204* (2013.01); *H04N 1/00323* (2013.01); *H04N 1/00408* (2013.01); *H04N 2201/0094* (2013.01)

(58) Field of Classification Search
CPC ........... H04N 1/00029; H04N 1/00034; H04N 1/00039; H04N 1/00204; H04N 1/00323; H04N 1/00408; H04N 2201/0094; G06T 11/206

See application file for complete search history.

(56) References Cited

U.S. PATENT DOCUMENTS

| | | | |
|---|---|---|---|
| 5,933,584 A * | 8/1999 | Maniwa | H04N 1/00204 358/1.15 |
| 8,462,368 B2 | 6/2013 | Osadchyy et al. | |
| 2002/0178048 A1 | 11/2002 | Huffman | |
| 2007/0014614 A1 * | 1/2007 | Yoshida | G03G 15/5016 400/62 |
| 2011/0235108 A1 | 9/2011 | Kato | |
| 2013/0250329 A1 | 9/2013 | Satoh | |
| 2015/0138579 A1 * | 5/2015 | Miyazaki | H04N 1/00007 358/1.13 |
| 2015/0302619 A1 | 10/2015 | Marum et al. | |

* cited by examiner

*Primary Examiner* — Laura A Gudorf
(74) *Attorney, Agent, or Firm* — McDonnell Boehnen Hullbert & Berghoff (57) ABSTRACT

The present disclosure is directed to a method for generating a visual display of metrics for one or more peripheral devices. The method involves receiving a plurality of data values indicative of a particular metric. The method also involves determining an average value of the plurality of data values and a ratio between the average value and a particular data value. The method further involves generating a bar graph with at least a first bar representative of the average value and a second bar representative of the particular data value. Additionally, the method involves modifying a longer bar of the first bar and the second bar based on a quotient between the average value and the particular data value based on the ratio being greater than or equal to a threshold ratio. The method also involves causing a display device to display the bar graph.

6 Claims, 7 Drawing Sheets

USER INTERFACE FOR PRESENTING DEVICE METRICS

CROSS-REFERENCE TO RELATED APPLICATION

The present application is a divisional of, and claims the benefit of priority from, U.S. patent application Ser. No. 14/634,744, filed Feb. 28, 2015, the content of which is herewith incorporated by reference in its entirety.

BACKGROUND

Unless otherwise indicated herein, the materials described in this section are not prior art to the claims in this application and are not admitted to be prior art by inclusion in this section.

An image forming apparatus may be any peripheral that produces a human-readable representation of graphics and/or text onto a physical medium. Example image forming apparatuses include printers and multifunction peripherals (MFPs). An image forming apparatus may be utilized for various tasks such as printing, scanning, and faxing, as well as many other uses.

Various aspects of an image forming apparatus may be tracked and monitored. A large number of metrics—for example, counters, meters, errors, and faults—may be monitored and used to assess the state of an image forming apparatus. Presenting such metrics as numbers without additional context may be difficult to interpret and require considerable time to understand.

SUMMARY

The present application discloses embodiments that relate to generating a visual display of metrics of one or more printing devices. In one aspect, the present application describes a method. The method includes receiving a plurality of data values indicative of a particular metric associated with a respective set of peripheral devices. The method also includes determining an average value of the plurality of data values. The method further includes determining a ratio between the average value and a particular data value from among the plurality of data values. Additionally, the method includes generating a bar graph with at least a first bar representative of the average value and a second bar representative of the particular data value. A length of the first bar corresponds to the average value and a length of the second bar corresponds to the particular data value. Further, the method includes modifying a longer bar of the first bar and the second bar based on a quotient between the average value and the particular data value based on the ratio being greater than or equal to a threshold ratio. Modifying the longer bar includes (i) reducing a length of the longer bar and (ii) adding a number of blocks at an end of the longer bar based on the quotient in place of the reduced length of the given bar. The method also includes causing a display device to display the bar graph.

In another aspect, the present application describes a printing device. The printing device includes a printing unit, a display unit, a memory unit, and at least one processor. The memory unit may have stored thereon at least a particular data value indicative of a particular metric associated with the printing device. The at least one processor may be configured to execute instructions. The instructions include receiving a plurality of data values indicative of the particular metric associated with a respective set of printing devices. The instructions also include determining an average value of the set of data values. The instructions further include determining a ratio between the average value and the particular data value stored on the memory unit. Additionally, the instructions include generating a visual data graph with at least a first shape representative of the average value and a second shape representative of the particular data value. A size of the first shape corresponds to the average value and a size of the second shape corresponds to the particular data value. Further, the instructions include modifying a larger shape of the first shape and the second shape based on a quotient between the average value and the particular data value based on the ratio being greater than or equal to a threshold ratio. Modifying the larger shape includes (i) reducing a size of the longer shape and (ii) adding a number of shapes based on the quotient in place of the reduced size of the longer shape. The instructions also include causing the display unit to display the visual data graph.

In yet another aspect, the present disclosure describes a non-transitory computer-readable medium having instructions stored thereon that, upon execution by at least one processor, perform a set of operations. The operations include receiving a first plurality of data values indicative of a total number of pages printed by a respective plurality of peripheral devices. The operations also include receiving a second plurality of data values indicative of a total number of errors that have occurred on the respective plurality of peripheral devices. The operations further include determining a relationship between the first plurality of data values and the second plurality of data values. Additionally, the operations include receiving a third data value indicative of a total number of pages printed by a particular peripheral device and a fourth data value indicative of a total number of errors that have occurred on the particular peripheral device. Further, the operations include determining that the particular peripheral device is problematic based on the third data value, the fourth data value, and the determined relationship. The operations also include causing a display device to display an indication that the particular peripheral device is problematic.

In another aspect, the present application describes a system. The system includes a means for receiving a plurality of data values indicative of a particular metric associated with a respective set of peripheral devices. The system also includes a means for determining an average value of the plurality of data values. The system further includes a means for determining a ratio between the average value and a particular data value from among the plurality of data values. Additionally, the system includes a means for generating a bar graph with at least a first bar representative of the average value and a second bar representative of the particular data value. A length of the first bar corresponds to the average value and a length of the second bar corresponds to the particular data value. Further, the system includes a means for modifying a longer bar of the first bar and the second bar based on a quotient between the average value and the particular data value based on the ratio being greater than or equal to a threshold ratio. Modifying the longer bar includes (i) reducing a length of the longer bar and (ii) adding a number of blocks at an end of the longer bar based on the quotient in place of the reduced length of the given bar. The system also includes a means for causing a display device to display the bar graph.

The foregoing summary is illustrative only and is not intended to be in any way limiting. In addition to the illustrative aspects, embodiments, and features described above, further aspects, embodiments, and features will become apparent by reference to the figures and the following detailed description.

DETAILED DESCRIPTION

Example methods and systems are described herein. Any example embodiment or feature described herein is not necessarily to be construed as preferred or advantageous over other embodiments or features. The example embodiments described herein are not meant to be limiting. It will be readily understood that certain aspects of the disclosed systems and methods can be arranged and combined in a wide variety of different configurations, all of which are contemplated herein.

Furthermore, the particular arrangements shown in the Figures should not be viewed as limiting. It should be understood that other embodiments might include more or less of each element shown in a given Figure. Further, some of the illustrated elements may be combined or omitted. Yet further, an example embodiment may include elements that are not illustrated in the Figures.

I. Overview

An example embodiment involves generating a visual display of metrics for one or more peripheral devices. A compact and effective visual display of metrics may allow a user or serviceperson to more quickly and efficiently understand the state of a peripheral device. Diagnosing the "health" of a peripheral device often involves understanding various aspects about the peripheral device's operational history. Such a history may include recorded information that, when viewed in a raw or non-contextualized manner, is difficult to interpret and may lead to inaccurate assessments of the health of the peripheral device. Furthermore, the operational history may not provide meaningful information without being compared the operational history of other peripheral devices.

Visual data graph display methods and techniques of the present application may provide a more comprehensive, intuitive, and contextual understanding of the state of a peripheral device. The operational history of a number of peripheral devices may be collected, analyzed, and compared to the operational history of a particular peripheral device. By generating a visual display representative of such a comparison, a user or serviceperson may better understand the health of the peripheral device and be able to more efficiently identify if a certain peripheral device is problematic.

The methods and operations of the present application may involve analyzing the operational history of peripheral devices to identify one or more metrics. Data reduction and/or other mathematical techniques may be employed to process "raw" information (e.g. logged information about events, counters, and/or meters) to derive any variety of metrics. An average metric may be determined from a group of peripheral devices, while a particular metric may be determined for a particular peripheral device. Comparing the average metric to a particular metric and generating a visual display graph that represents this comparison provides a better understanding of the peripheral device's performance within the context of other peripheral devices.

Certain metrics derived from a peripheral device's operational history might signal a necessity for certain maintenance, parts replacement, and post-sale services (e.g. customer billing). Additionally, a particular metric of a particular peripheral device that deviates significantly (e.g. exceeds a statistical threshold) from an average metric of a group of peripheral devices may indicate that the particular peripheral device is problematic.

A visual data graph generated using techniques disclosed herein may be displayed on an operation panel of the peripheral device, on a remote computing device serving as a monitoring and maintenance device, and/or a mobile computing device.

It should be understood that terms such as "metric," "counter," and "meter" refer to measurable aspects of a printing device. Some metrics include a number of printed pages, a number of faults or errors that have occurred, and an average amount of toner used per page, among other possible measurable aspects. A given metric may include more specific information as well, such as a number of printed pages within a given time frame (e.g. over a particular month). Various metrics are contemplated herein.

Each metric may be determined from tracked or logged information. Logged information may include a plurality of entries from which metrics may be derived or calculated from. A given entry may include one or more values corresponding to an event. For example, an entry may indicate a number of pages printed for a certain print job. As another example, an entry may indicate that an error has occurred and record a fault code associated with that particular error. As yet another example, an entry may include a volume amount of ink or toner used on a particular page or for a particular print job. Each entry may also log a date and time, a user associated with the entry, and the particular printer associated with the entry, among other information. Statistical techniques may be applied to a portion of the log entries to identify one or more metrics therefrom.

II. Example Image Forming Apparatuses

Figure 1:
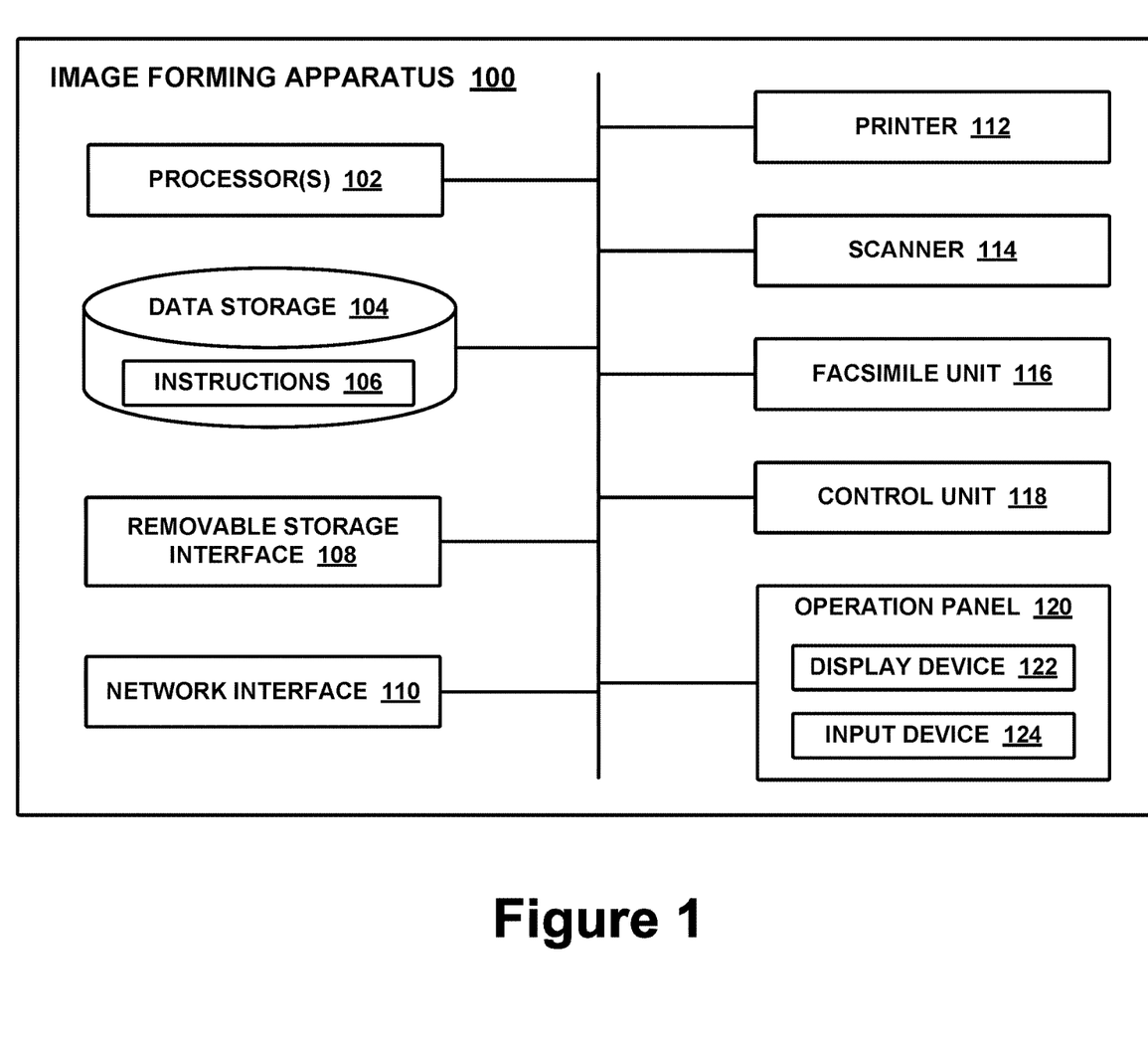
FIG. 1 is a schematic block diagram illustrating an image forming apparatus, according to an example embodiment.

FIG. 1 is a schematic block diagram of illustrating an image forming apparatus 100, according to an example embodiment. The image forming apparatus 100 includes processor(s) 102, data storage 104 that has stored thereon instructions 106, a removable storage interface 108, a network interface 110, a printer 112, a scanner 114, a facsimile (FAX) unit 116, a control unit 118, and an operation panel 120 that includes a display device 122 and an input device 124. Each unit of image forming apparatus 100 may be connected to a bus, allowing the units to interact with each other. For example, the processor(s) 102 may request information stored on data storage 104.

The processor(s) 102 may include one or more processors capable of executing instructions, such as instructions 106, that cause the image forming apparatus 100 to perform various operations. The processor(s) 102 may include general-purpose central processing units (CPUs) and cache memory. The processor(s) 102 may also incorporate processing units for specific purposes, such as application-specific integrated circuits (ASICs) and field-programmable gate arrays (FPGAs). Other processors may also be included for executing operations particular to image forming apparatus 100.

The data storage 104 may store thereon instructions 106, which are executable by the processor(s) 102. The data storage 104 may also store information for various programs and applications, as well as data specific to the image forming apparatus 100. For example, the data storage 104 may include data for running an operating system (OS). In addition, the data storage 104 may store user data that includes various kinds of information about any number of users. The data storage 104 may include both volatile memory and non-volatile memory. Volatile memory may include random-access memory (RAM). Some examples of non-volatile memory include read-only memory (ROM), flash memory, electrically erasable programmable read only memory (EEPROM), digital tape, a hard disk drive (HDD), and a solid-state drive (SSD). The data storage 104 may include any combination of readable and/or writable volatile memories and/or non-volatile memories, along with other possible memory devices.

The removable storage interface 108 may allow for connection of external data storage, which may then be provided to the processor(s) 102 and/or the control unit 118 or copied into data storage 104. The removable storage interface 108 may include a number of connection ports, plugs, and/or slots that allow for a physical connection of an external storage device. Some example removable storage devices that may interface with image forming apparatus 100 via the removable storage interface 108 include USB flash drives, secure-digital (SD) cards (including various shaped and/or sized SD cards), compact discs (CDs), digital video discs (DVDs), and other memory cards or optical storage media.

The network interface 110 allows the image forming apparatus 100 to connect to other devices over a network. The network interface 110 may connect to a local-area network (LAN) and/or a wide-area network (WAN), such as the Internet. The network interface may include an interface for a wired connection (e.g. Ethernet) and/or wireless connection (e.g. Wi-Fi) to a network. The network interface 110 may also communicate over other wireless protocols, such as Bluetooth, radio-frequency identification (RFID), near field communication (NFC), 3G cellular communication such as CDMA, EVDO, GSM/GPRS, or 4G cellular communication, such as WiMAX or LTE, among other wireless protocols. Additionally, the network interface 110 may communicate over a telephone landline. Any combination of wired and/or wireless network interfaces and protocols may be included in network interface 110.

The printer 112 may be any device or peripheral capable of producing persistent human-readable images and/or text on a printing medium, such as paper. The printer 112 may receive print data from other units of image forming apparatus 100 representing images and/or text for printing. The printer 112 may employ a variety of technologies, such ink-based printing, toner-based printing, and thermal printing, among other technologies. An assortment of mechanical and/or electro-mechanical devices may make up the printer 112 to facilitate the transportation of printing media and the transferring of images and/or text onto the printing media. For example, the printer 112 may include trays for the storage and staging of printing media and rollers for conveying the printing media through the printer 112. The printer 112 may also include ink heads for dispensing ink onto a printing medium, photosensitive drums onto which lasers are shone to charge the drums and attract toner that is transferred onto a printing medium, and/or a thermal head for heating certain areas of a printing medium to generate images and/or text. Other devices may also be incorporated within printer 112.

The scanner 114 may be any device that can scan a document, image, or other object (which may collectively be referred to as "scanning medium" hereinafter) and produce a digital image representative of that scanning medium. The scanner 114 may emit light (e.g. via LEDs) onto the scanning medium and sense the light reflecting off the scanning medium (e.g. via a charge coupled device (CCD) line sensor or a complementary metal oxide semiconductor (CMOS) line sensor). In some implementations, the scanner 114 includes a platen glass onto which a document may be placed to be scanned. In addition, the scanner 114 may perform post-processing on the scanned image, such as rotation, compression of the data, and/or optical character recognition (OCR), among other post-processing operations.

The facsimile unit 116 may scan a document and/or images (which may be collectively referred to as "printed material" hereinafter) and transmit the scanned printed material over a telephone line (i.e. fax the scanned printed material). The facsimile unit 116 may fax the scanned printed material via the network interface 110. The facsimile unit 116 may also receive a fax transmission and communicate the received data to the printer 112 for printing. In some implementations, the facsimile unit 116 includes buttons for configuring the facsimile unit 116 and dialing a phone number and a display for displaying the status of the fax transmission, among other things.

The control unit 118 may control various electrical and/or mechanical components of the image forming apparatus 100. For example, the control unit 118 may operate one or more paper sheet feeders, conveyors, rollers, and other mechanical devices for transporting paper through the printer 112. The control unit 118 may also include device drivers that facilitate network communication, electronic displays, and the reading of information from various sensors or readers coupled to the image forming apparatus 100. In some implementations, the control unit 118 is a software application or program that interfaces the processor(s) 102 with the various units of the image forming apparatus 100.

The operation panel 120 includes a display device 122 and an input device 124 for facilitating human interaction with the image forming apparatus 100. The display device 122 may be any electronic video display, such as a liquid-crystal display (LCD). The input device 124 may include any combination of devices that allow users to input information into the operation panel 120, such as buttons, a keyboard, switches, and/or dials. In addition, the input device 124 may include a touch-screen digitizer overlaid onto the display device 122 that can sense touch and interact with the display device 112.

A "unit" as referred to herein may refer to a device, component, module, or other combination of electrical and/or mechanical elements that accomplish a particular task. In some instances, a unit may refer to a physical device that performs certain activities, such as the facsimile unit 116. Regardless of the combination of hardware and software components that make up a unit, it should be understood that units are operable to accomplish certain tasks, and may interact with other units through hardware and/or software interfaces.

III. Example System

Figure 2:
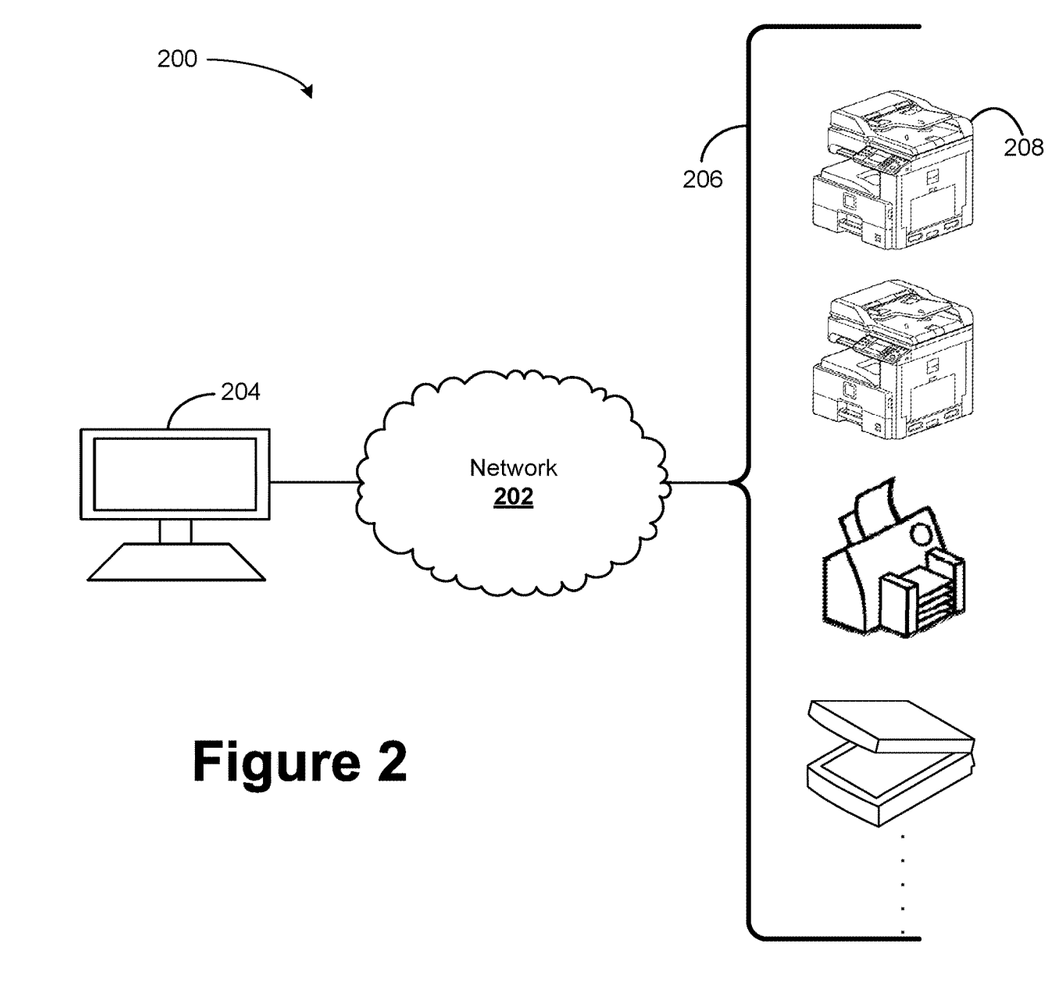
FIG. 2 is a schematic block diagram of a system, according to an example embodiment.

FIG. 2 is a schematic block diagram of a system 200, according to an example embodiment. The system 200 is an example system that includes a network 202 that communicatively connects computing device 204 with a group of peripheral devices 206. The group of peripheral devices 206 may include any combination of peripheral devices, multi-function peripheral (MFP) 208.

A "peripheral device" as described herein may refer to any auxiliary device that a user can interact and performs one or more functions and/or operations. Some example peripheral devices include a printer, a scanner, and a facsimile machine. In some instances, a peripheral device may be capable of performing multiple functions and/or operations. For example, a peripheral device may be able to print documents and scan documents. For the purposes of this application, a device capable of performing multiple functions and/or operations (e.g. at least two of printing, scanning, and facsimile transmission, among other possible functions and/or operations) may be referred to herein as a multi-function peripheral (MFP).

A peripheral device may also be able to store information on a memory or storage medium of that peripheral device. Furthermore, peripheral devices may be able to connect to a network, via a wired and/or wireless connection, to transmit information (e.g. logged or tacked information). Certain peripheral devices may also include a display unit or an operation panel on which information may be displayed. For the purposes of this application, such a peripheral device that can store and transmit information and/or display information may still be referred to as a peripheral device.

The network 202 may be a local area network, a wide area network, or a combination thereof. In some embodiments, the computing device 204 and the peripheral devices 206 may all be connected to the same local area network. In another embodiment, the computing device 204 is a remote computing device that connects to one or more peripheral devices 206 over a wide area network, such as the Internet. It should be understood that the network 202 may be any type of network communication medium through which the devices within system 200 may communicate, transmit, and/or receive information.

The computing device 204 may be any computing device capable of sending information to one or more of the peripheral devices 206 and processing information received from one or more of the peripheral devices 206. The computing device 204 may perform some of the operations of the visual data graph display methods disclosed herein. In some implementations, the computing device 204 includes a display unit on which generated data graphs are displayed. Although the computing device 204 is depicted as a desktop computer, the computing device 204 may be a server, a laptop computer, a tablet, a smart phone, or another mobile computing device.

The group of peripheral devices 206 may include any combination of peripheral devices. FIG. 2 illustrates the peripheral devices 206 as including two MFPs (including MFP 208), a printing device, and a scanning device. Any variety of peripheral devices and MFPs may be included within the peripheral devices 206. In some cases, multiple peripheral devices of the same model may exist within the group of peripheral devices 206. In some instances, the group of peripheral devices 206 may be associated with a company, a particular office of that company, or a floor within such an office, to name a few examples. In other instances, the group of peripheral devices 206 may be all peripheral devices of a particular model in operation. Any other combination of devices may be included within the group of peripheral devices 206.

The MFP 208 may be any kind of multi-function peripheral. The MFP, in some implementations, may be similar to or the same as image forming apparatus 100. In some embodiments, the MFP 208 may include a display unit or operation panel on which visual data graphs may be displayed.

It should be understood that visual display techniques disclosed in the present application may be implemented on the computing device 204, any printing device within the group of printing devices 206 (including MFP 208), and on other computing devices with display devices (e.g. mobile computing devices).

It should also be understood that the system 200 is an example system that is provided for explanatory purposes. Any number of mobile devices, computers, laptops, peripheral devices, and/or MFPs may also be included within a system within which visual data graph display techniques are performed.

IV. Example Embodiments

A. Example Data

The following section describes an example data scheme that may be used in performing the visual data graph operations and techniques of the present application. A peripheral device may track or log information about various aspects of its operation. The tracked or logged information may be stored in the form of a plurality of entries. Each entry may include information about a particular event that occurred on the peripheral device. Some example information that may be included within a given entry includes an event identifier, a sub-event identifier, a date of the event, a time of the event, and additional information specific to that particular event. Furthermore, an entry may contain information about a user associated with the event, the peripheral device on which the event occurred, and information about the customer associated with the peripheral device, among other kinds of information.

An event identifier may represent the kind of event that occurred. Some example events include a print job execution or a print job failure, among other possible events. The event identifier may be encoded such that a particular value corresponds to a particular type of event. The sub-event identifier may provide further information about the kind of event that occurred. For example, a print job may be executed as a result of a print job being sent to a printing device, a copy operation being performed using a scanning operation of an MFP, or in response to receiving a facsimile transmission. Accordingly, the sub-event identifier may provide additional information about the context of the event. As another example, when the event identifier is a print job failure, the sub-event identifier may be a fault code or other value representative of the type of failure. Some example print job failures may include a paper jam or being out of ink or toner, among other possible failures. More specific information about an event may also be stored.

Metrics may be derived from the above-described logged information. A given type of event may be counted to determine a total number of times that event occurred. For example, for an event where a single page is printed, counting all such occurrences of that event in the logged information may provide a value that reflects the total number of pages printed. Other information included within the entries may also provide narrowing contextual information identify more specific metrics. For example, an example metric may be determined by counting all occurrences of a particular error or fault code.

A metric may also be associated with a particular context. For instance, a metric may count all occurrences of a particular event that occurred on all peripheral devices of a particular model. As one example, a metric may represent a total number of pages printed by all printing devices of a particular model. In some embodiments, a metric may be associated with a particular period of time. For example, a metric may represent a number of pages printed by a plurality of printing devices over a specified three-month period (e.g. a business quarter).

A given metric may be also determined using mathematical or statistical techniques to identify even more specific information. For instance, it may be desired to determine an amount of ink or toner used per page on average for a given printing device. Such a metric may be determined by counting a total number of pages printed, a total amount of ink or toner consumed, and dividing the pages printed by the amount of ink or toner to determine the desired metric.

In some implementations, some of the logged information may be more simply tracked. For example, a printing device may store a number of counters (which may also be referred to herein as "meters") that may be incremented or decremented upon the occurrence of an event. For example, a print job may involve printing 25 pages, and a page counter of the printing device may increment by 25 upon execution of that print job.

The examples disclosed herein describe utilizing such logged information and determining a variety of metrics from that information. It should be understood that any other kind of metric not specifically described herein may be derived from logged information and utilized within the methods and techniques of the present application.

B. Generating Example Data Graphs

Figure 3:
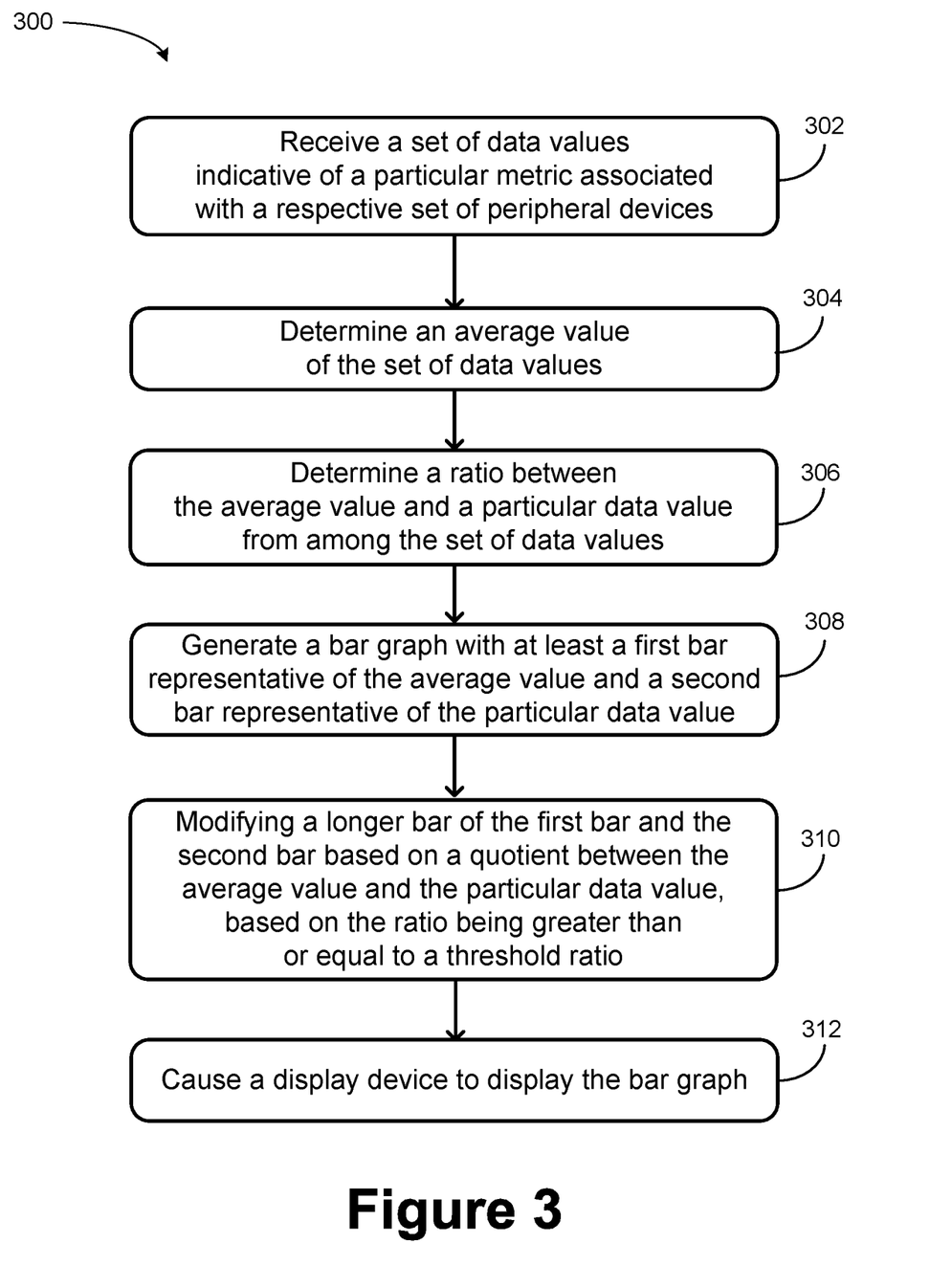
FIG. 3 is a flowchart illustrating a method, according to an example embodiment.

FIG. 3 is a flowchart illustrating a method 300, according to an example embodiment. More specifically, the method 300 depicts operations for generating and displaying a bar graph. The method 300 may be performed on image forming apparatus 100, or on a variety of other devices, such as computing devices (e.g. computing device 204), mobile devices, client devices, and servers, among other possible devices. The following method 300 describes an example of comparing a number of pages printed for explanatory purposes. It should be understood that any other metric may be determined, analyzed, and displayed using the operations disclosed herein.

At step 302, the method 300 involves receiving a set of data values indicative of a particular metric associated with a respective set of peripheral devices. The data values may be similar to or the same as the entries of logged information described above. In some embodiments, the data values may only be associated with a particular metric. For example, the logged information may be filtered to provide entries pertaining to a particular metric, such as a number of pages printed. In this example, the set of data values may be logged entries associated with print jobs and other events in which pages are printed.

Alternatively, in some embodiments, the set of data values may be counters or meters representative of a cumulative metric, such as a total number of pages printed or a total number of print job faults that have occurred. In some implementations, multiple counters may be maintained by peripheral devices that provide additional context. For example, a counter may be maintained that represents the number of pages printed via print jobs, while a separate counter may be maintained that represents the number of pages printed via copy jobs. Such a cumulative counter may be referred to herein as "data values," while the contextual counters that represent a portion of the cumulative counter may be referred to herein as a "sub-value."

At step 304, the method 300 involves determining an average value of the set of data values. The average value may represent the mean value of a metric for a group of peripheral devices. In some implementations, determining this average value may involve calculating the metric for each peripheral device within the set of peripheral devices, then determining the average by taking the sum of those metrics and dividing by the number of peripheral devices. In some instances, determining the average value may involve adding up the entire plurality of data values and dividing by the number of peripheral devices, without separately calculating the metric for each peripheral device.

Referring to the example of generating a visual display graph of a number of pages printed, the average value may be determined by adding up a total number of pages printed by all peripheral devices in the set of peripheral device and dividing the total number of pages printed by the number of peripheral devices in the set.

At step 306, the method 300 involves determining a ratio between the average value and a particular data value from among the set of data values. For the purposes of this application, a "ratio" may refer to a quantitative comparison between two values. As an example, a ratio between the values 25 and 10 may be 2.5:1. The ratio may represent a quotient (2 in the example) and a remainder (0.5 in the example). Regardless of the particular implementation, a quantitative comparison between the average value and the particular data value may be calculated and used as a basis to generate a bar graph in subsequent steps.

At step 308, the method 300 involves generating a bar graph with at least a first bar representative of the average value and a second bar representative of the particular data value. The respective lengths of the first bar and the second bar may be proportional to each other. However, in certain scenarios, the length of the first bar and the second bar may be modified. For instance, if one of the bars is considerably longer than the other one, it may be impractical to display such a comparison because meaningful information may not be derived easily from such a bar graph. In cases where the average value and the particular data value are relatively close in value (e.g. ratio between the longer bar to the shorter bar is less than 2:1), no further modification may be performed.

At step 310, the method 300 involves modifying a longer bar of the first bar and the second bar based on a quotient between the average value and the particular data value, based on the ratio being greater than or equal to a threshold ratio. In instances where one of the generated bars is significantly greater in length compared to the other bar, the quotient between them might be fairly large in value. For example, if the first bar were four times longer than the second bar (i.e. when the average value is four times greater than the particular data value), the quotient between the average value and the particular data value would be equal to 4.

The "quotient" as discussed in this application refers to the value resulting from dividing the greater of the average value and the particular data value with the lesser of the average value and the particular data value. For example, if the average value is 12 and the particular data value is 3, the quotient would be 4. As another example, if the particular data value is 21 and the average value is 7, the quotient would be 3. In other words, the quotient refers to the whole number resulting from the division between the greater value and the lesser value.

Accordingly, modifying the longer bar of the two generated bars may first involve determining which of the bars is the longer bar. This may be accomplished by comparing the average value to the particular data value and identifying which of those two values is greater. Then, the quotient between the two values is determined, which represents how many multiples that the longer bar is longer than the shorter bar.

The operation of modifying the longer bar may occur only if the determined ratio is greater than or equal to a threshold ratio. As one example, a threshold ratio may be 3:1 (i.e. the longer bar being at least 3 times longer than the shorter bar). In this example, if the determined ratio is greater than 3:1, the longer bar may be modified.

Figure 4A:
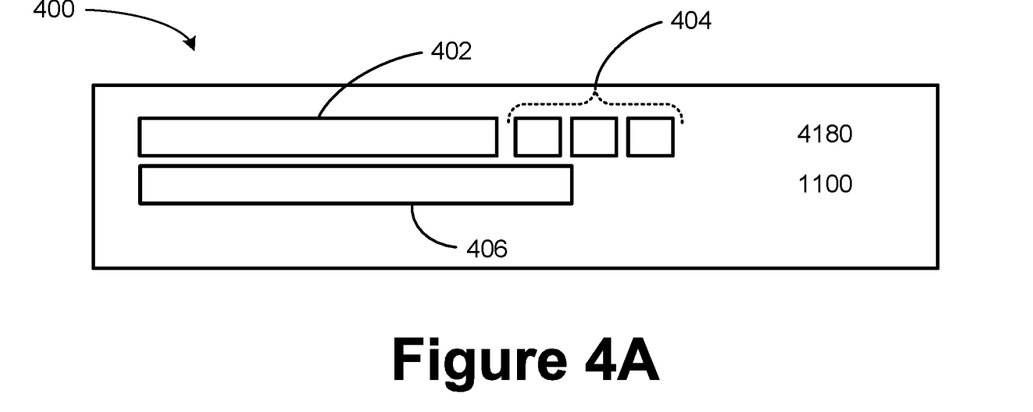
FIG. 4A, FIG. 4B, and FIG. 4C illustrate example visual data graphs, according to an example embodiment.

In some embodiments, modifying the longer bar may involve reducing the length of the longer bar and appending one or more blocks onto the end of the bar. The number of blocks appended at the end of the longer bar may be equal to or based on the quotient. In these embodiments, when one of the bars is significantly longer than the other (such that the ratio between the values that represent those bars exceeds a threshold ratio), the length of the longer bar may be reduced and have blocks appended to the end of the bar, which represent the whole number of times that the longer bar is greater than the first bar. The resulting bar graph with a modified longer bar may be more easily interpreted at a glance, without having to measure the lengths of the bars or read the respective values that the bars represent. As an example, FIG. 4A depicts a bar graph where the average value is more than three times greater than the particular data value. In FIG. 4A, the modified longer bar has three blocks appended at the end of the bar to represent this comparison (i.e. the ratio between the values that the bars represent).

Note that, after the longer bar has been modified, the length of the modified longer bar and appended blocks compared to the length of the shorter bar may no longer be proportional. However, in some embodiments, the modified longer bar may be reduced in length such that its modified length (not including the appended blocks) represents a remainder from the ratio between the two values. As a specific example, if the average value is 3.4 and the particular data value is 1, the quotient would be 3 and the remainder 0.4; in this example, the modified length of the bar (not including the appended blocks) may be four-tenths the length of the shorter bar. In this manner, at a glance, a user or serviceperson viewing the generated graph might be able to conveniently identify that the average value is approximately 3.4 times greater than the particular data value.

Other modifications may be performed on the longer bar, depending upon the particular implementation. The extent to which the length of the longer bar is reduced may depend on other factors, such as available screen real estate. In some implementations, the appended blocks may be placed at either the left end or the right end of the bar, or above or below the bar. Regardless of the particular implementation, the appended blocks may be visually associated with the longer bar to provide an indication of the comparison between the average value and the particular data value.

At step 312, the method 300 involves causing a display to display the bar graph. This may involve transmitting or otherwise providing information for rendering the bar graph to a computing device, a mobile device, or an operation panel of a peripheral device.

Figure 4B:
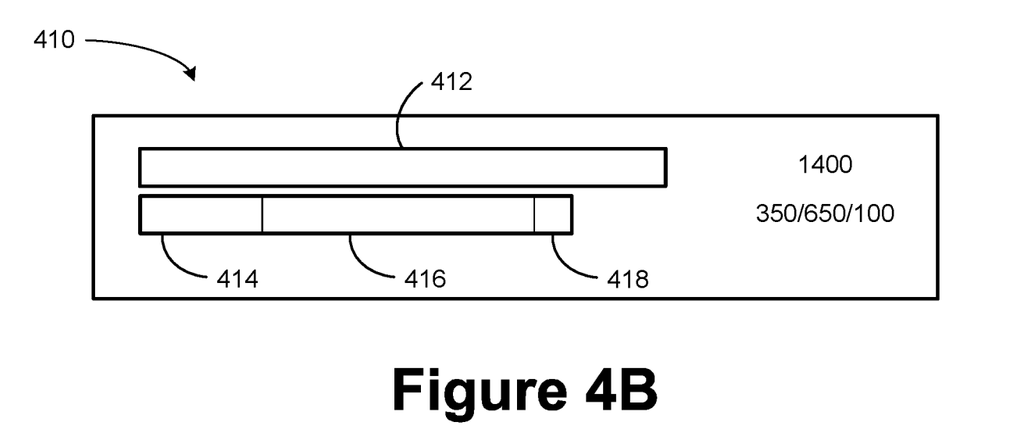
Figure 4C:
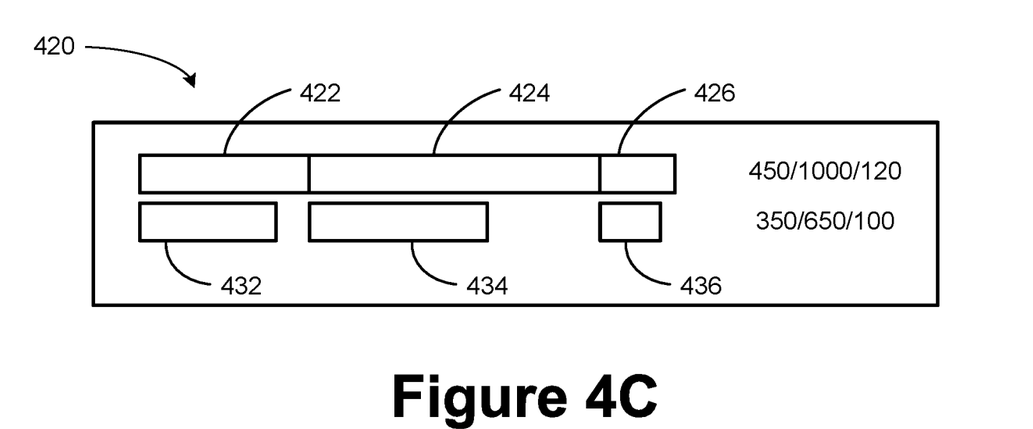

FIG. 4A, FIG. 4B, and FIG. 4C illustrate example visual data graphs, according to an example embodiment. The example lengths of the bars and values provided may not necessarily be drawn to scale, and are provided for explanatory purposes only.

FIG. 4A depicts an example bar graph 400 that includes blocks 404. The bar graph 400 in FIG. 4A may be generated using operations discussed with respect to FIG. 3. The bar graph 400 includes a modified longer bar represented by the reduced-length portion 402 and the appended blocks 404, and also includes the shorter bar 406. In the depicted example, the reduced-length portion 402 and appended blocks 404 may collectively represent the value of 4180. This value of 4180 may represent, for example, the average number of pages printed by a group of peripheral devices. The shorter bar 406 may represent the value of 1100, which might indicate the number of pages printed by a particular peripheral device. In this example bar graph, the ratio between 4180 and 1100 is 3.8, and accordingly the quotient is 3 and the remainder is 0.8. The reduced-length portion 402 may have a proportional length to the remainder (0.8 times the value of the particular data value 1100, which is equal to 880), while each appended block represents a whole number multiple of the particular data value (in this case, each block is equal to 1100).

Consider the bar graph depicting a comparison between the average number of printed pages of a group of peripheral devices (the top modified bar) to the total number of pages printed by a particular peripheral device. At a glance, a user or serviceperson may approximate that the particular peripheral devices has printed out nearly four times (or more accurately approximately 3.8 times) fewer pages compared to an average peripheral device within the group of peripheral devices. Thus, the bar graph of FIG. 4A may be more efficiently interpreted and provide more meaningful visual information without having to examine quantitative values or measure the lengths of the bar.

Note that FIG. 4A illustrates an example scenario where the average number of printed pages of a group of peripheral devices (the top modified bar representing a value of 4180) exceeds the total number of pages printed by a particular peripheral device (the bottom bar representing a value of 1100). However, in other example scenarios the number of pages printed by a particular peripheral device may exceed the average number. In such scenarios, the top bar may not be modified, whereas the bottom bar (which, before modification is the longer bar of the top bar and the bottom bar) may be modified to have a reduced-length portion and appended blocks, similarly to top modified bar shown in FIG. 4A. In other words, modifying the length of a bar and appending blocks to the end of a modified-length bar may be performed for either bar depending on the average value and the particular value.

For example, if the number of pages printed by the particular peripheral device is 2500 and the average number printed pages of a group of peripheral devices is 1000, the length of the bottom bar may be reduced, and two blocks may be appended at the end of the bar, indicating that the particular number exceeds the average number by at least a factor of 2. It should be understood that modifying the length of a bar and appending blocks onto the end of the modified-length bar may be performed on either bar representing either the average value or the particular value. In the various example scenarios described herein—including those depicted in FIG. 4A, FIG. 4B, FIG. 4C, and FIG. 5—modifying the length of a bar and appending blocks onto the end of the modified-length bar may be performed in conjunction with the segmenting operations described below.

FIG. 4B depicts an example bar graph 410 where the bar associated with a particular peripheral device is segmented into first segment 414, second segment 416, and third segment 418. In this depicted example, the segments may be separated by a line or other visual indicator to illustrate that the particular data value includes three sub-values. The particular data value may include sub-values 350, 650, and 100, which correspond to first segment 414, second segment 416, and third segment 418, respectively.

As a specific example, the length of the top bar 412 might represent the average number of pages printed by a group of peripheral devices (1400 pages, in this example). The total length of the bottom bar might represent the total number of pages printed by a particular printing device (1100 pages, in this example). Each segment might represent a number of pages printed as a result of a particular operation. As one example, the first segment 414 might represent the number of pages printed resulting from an execution of a print job (350 pages, in this example), the second segment 416 might represent the number of pages printed resulting from a copy operation (650 pages, in this example), and the third segment 418 might represent the number of pages printed resulting from a facsimile operation (100 pages, in this example). Thus, at a glance, a user or serviceperson viewing the example bar graph 410 can easily compare the total number of pages printed on average to the total number of pages printed by a specific peripheral device, as well as understand the amount that each kind of operation contributed to the total number of pages printed by the specific peripheral device.

Note that, like FIG. 4A, FIG. 4B illustrates an example scenario where the average number of printed pages of a group of peripheral devices (the top bar representing a value of 1400) exceeds the total number of pages printed by a particular peripheral device (the segmented bottom bar representing a total value of 1100). As described above, other example scenarios may exist where the particular number exceeds the average number. In such example scenarios, the bottom bar—segmented or not—would exceed the length of the top bar.

Additionally, in various examples, the segmenting operation may be performed on the top bar instead of the bottom bar, or may be performed on both the top and bottom bars. In some examples, when both the top and bottom bar are segmented, the segmented portions of both bars may continuously form the length of the whole bar such that each segmented portion is touching a neighboring segmented portion (such as segments 414, 416, and 418 illustrated in FIG. 4B). In these examples, the respective segments between the top bar and the bottom bar may not necessarily be aligned with each other.

The example operations shown in FIG. 4A and FIG. 4B may be combined in certain scenarios. For example, if the average value in FIG. 4B were much larger (e.g. 3600), the length of the top bar could be reduced and blocks could be appended onto the end of the reduced-length top bar as described above. Similarly, in scenarios where the particular value was much greater than the average value (e.g. by at least a factor of 2), the length modification and block appending operations may be performed on the segmented bottom bar. For instance, if one of the segments were much greater than the average segments (e.g. by at least a factor of two), the length of that segment might be reduced and blocks may be appended onto the end of that segment. It should be understood that the length modification and block appending operations may be performed on any bar or segment for either the average value or the particular value, depending upon a comparison between the value that the bar or segment represents and the value that a corresponding bar or segment represents.

FIG. 4C depicts an example bar graph 420 where both bars displayed are segmented. The first average segment 422 corresponds to the first particular segment 432, the second average segment 424 corresponds to the second particular segment 434, and the third average segment 426 corresponds to the third average segment 436. Each of the corresponding segments may be aligned at one end to allow for a clear visual comparison between the two values. The example bar graph 420 allows a user or serviceperson to more easily compare average sub-values to particular sub-values. Similarly to the example described above with respect to FIG. 4B, the segments may correspond to a number of pages printed as a result of a print operation, a copy operation, or a facsimile operation.

As described above, any of the segments 422, 424, 426, 432, 434, and/or 436 may be reduced in length and have blocks appended at the end of the reduced-length segment. For example, if the segment 424 represented a value of 3500 and segment 343 represented a value of 1000, the length of segment 424 may be reduced and three blocks may be appended to the end of the reduced-length segment 424, indicating that the value represented by segment 424 is at least three times the value represented by segment 434. In the reverse scenario, segment 434 may be reduced in length and have blocks appended thereon if its value greatly exceeded the value represented by segment 424. It should be understood that any of the segments may be reduced in length—either the segments of the average value bar or segments of the particular value bar—and have blocks appended onto the end of the reduced-length segment.

Note that the length reduction and block appending operations may be performed if the value represented by one of the segments (for either the average value or the particular value) exceeds the value represented by the corresponding segment by a threshold value. Thus, certain circumstances may arise where a first segment of the average value greatly exceeds a corresponding first segment of the particular value, and a second segment of the average value is much less than a corresponding second segment of the particular value. In such circumstances, the first segment of the average value may be reduced in length and have blocks appended thereto, and the second segment of the particular value may be reduced in length and have blocks appended thereto. Thus, the length modification and block appending operations may be performed on a segment of the average value and a segment of the particular value on the same bar graph.

Figure 5:
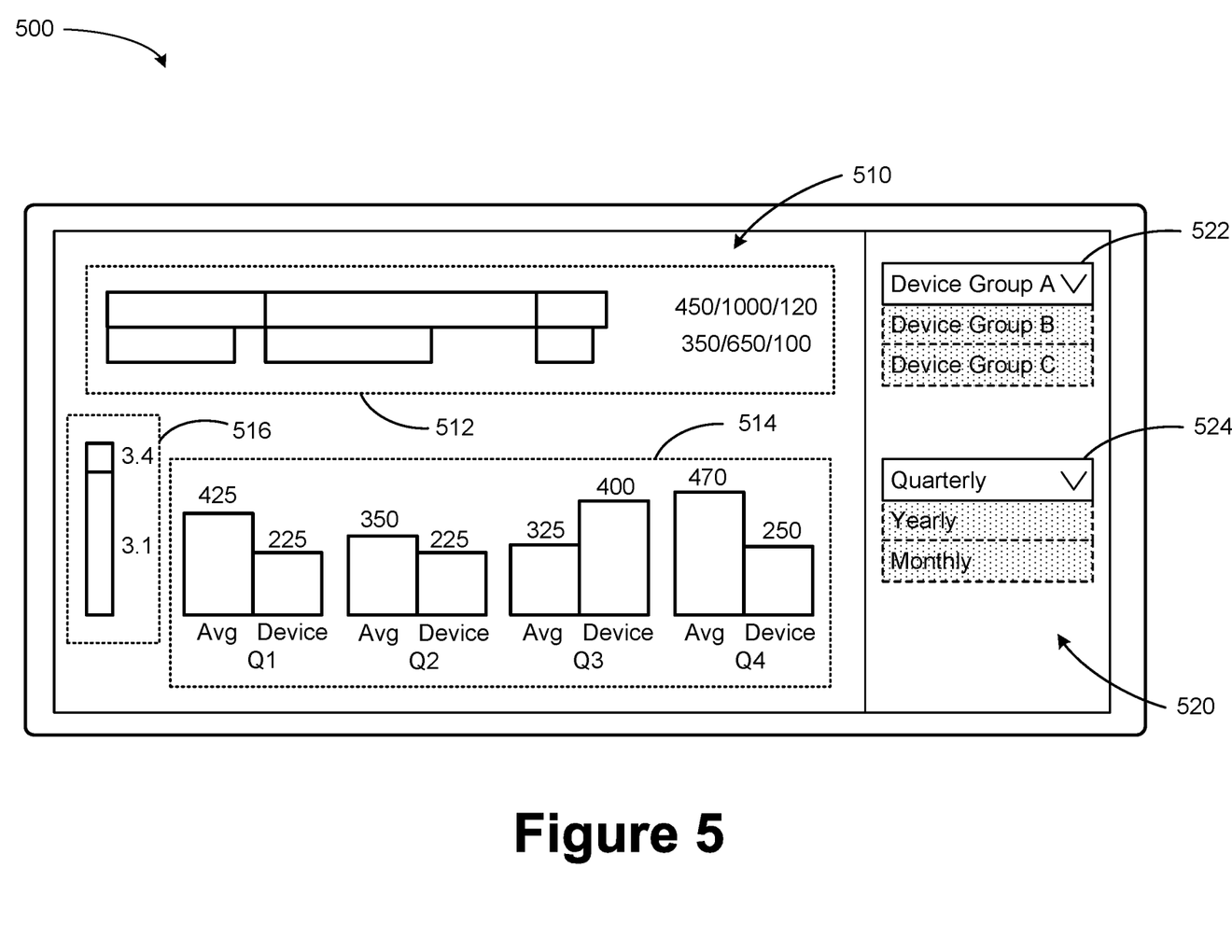
FIG. 5 illustrates an example data graph display, according to an example embodiment.

FIG. 5 illustrates an example data graph display 500, according to an example embodiment. The example visual data graph includes a data display area 510 and a filter selection area 520. The data display area 510 includes three sections: a counter bar graph section 512, a historical bar graph section 514, and a toner comparison section 516. The filter selection area 520 includes two graphical control elements: a device group selector 522 and a historical time frame selector 524. The example data graph may be displayed on a display unit of a computing device, a mobile device, or on an operation panel of a peripheral device.

The filter selection area 520 may be controlled to select a desired set of filters with which to select data to be used in generating the graphs displayed in the data display area 510. Device group selector 522 may be configured to select a particular group of peripheral devices. The data graph generation techniques disclosed in the present application may be applied to the operational data (i.e. logged information entries) associated with the selected group of peripheral devices of the device group selector 522. Peripheral devices may be grouped by customer, model number, or peripheral device type, among other possible peripheral device groups.

The time frame selector 524 may be configured to select a time frame length to use in generating the historical bar graph section 514. In the depicted example, historical information may be depicted monthly, quarterly, or yearly. If "monthly" is selected, the historical bar graph section 514 might depict bar graph comparisons for each month out a year. If "quarterly" is selected, as in FIG. 5, bar graph comparisons for four quarters may be depicted. Various implementations may provide more granular control over the time frame groupings, the starting date, and the ending date that can be selected.

The counter bar graph section 512 might be similar to the example bar graph depicted in FIG. 4C. As a specific example, the top bar segments may represent the average number of pages printed for peripheral devices in group "A" resulting from print, copy, and facsimile operations. The bottom bar segments may represent the number of pages printed for a particular peripheral device resulting from print, copy, and facsimile operations.

Note that the counter bar graph section 512 depicts a scenario where the average value segments are all greater than their respective particular value segments but none of the segments have been modified using the block appending operations described above. Any of the bar representations depicted in FIG. 4A, FIG. 4B, and/or FIG. 4C, or any variations on those representations described above might be shown in the counter bar graph section 512. In certain scenarios, the average value, the particular value, and the sub-values that comprise the average value and particular value may be values suitable to be depicted as reduced-length bars with appended blocks. Thus, in some examples, a computing device rendering the counter bar graph section 512 may perform operations of the present application to determine whether the appended block-representation is appropriate for a given bar or segment and subsequently reduce the length of that given bar or segment and append blocks thereto.

The historical bar graph section 514 displays one or more bar graphs corresponding to a metric over multiple periods of time. The time periods for each bar graph displayed in the historical bar graph section 514 may depend upon selected options of, for example, the time frame selector 524. In the example depicted in FIG. 5, four bar graph comparisons are displayed that each represent a respective quarter (i.e. a 3-month period of time within a fiscal year). Each bar graph comparison, corresponding to a particular quarter, might compare an average value representative of a metric for a group of peripheral devices (e.g. within group "A") within that quarter to a particular data value representative of a metric for a particular peripheral device within that quarter.

In the depicted example shown in FIG. 5, consider the historical bar graph section 514 displaying comparison bar graphs between an average number of pages printed to a number of pages printed for a particular peripheral device over each quarter. In this example, a user or serviceperson might be able to more easily identify that the particular peripheral device usually prints fewer pages, except for during Q3, where the particular peripheral device printed more pages than the average peripheral device within group "A". Depicting the historical information in this way provides a more efficient way to identify trends, understand the operation history of a peripheral device, determine significant deviations from expected or average values for different metrics, and correlate historical information with occurrences of other issues, among other possibilities.

The toner comparison section 516 may provide a visual comparison between an amount of toner used per page on average for a group of peripheral devices and an amount of toner used per page on average for a particular device. In the depicted example, this amount is equal to 3.4 (e.g. a volume amount or a mass amount) for the group of peripheral devices, and equal to 3.1 for the particular peripheral device. Overlaying the two bars on top of each other as shown in the toner comparison section 516 is another technique for comparing data values that can be quickly interpreted.

It should be understood that the values shown in FIG. 5 are example values and may not necessarily correlate with actual data values used in various instances or implementations. Additionally, the sections and areas of the example data graph display 500 may be arranged in other ways, depending upon the particular implementation and the size and resolution of the display unit on which the graphs are displayed, among other factors. Furthermore, filters described in this example are merely example filters; in other implementations, fewer or a greater number of filters may be provided that allow for more fine-grained control over the group of peripheral devices, the time frame, and other filterable aspects, such as the operation to compare and whether or not to segment the bar graphs.

C. Determining Problematic Peripheral Devices

Figure 6:
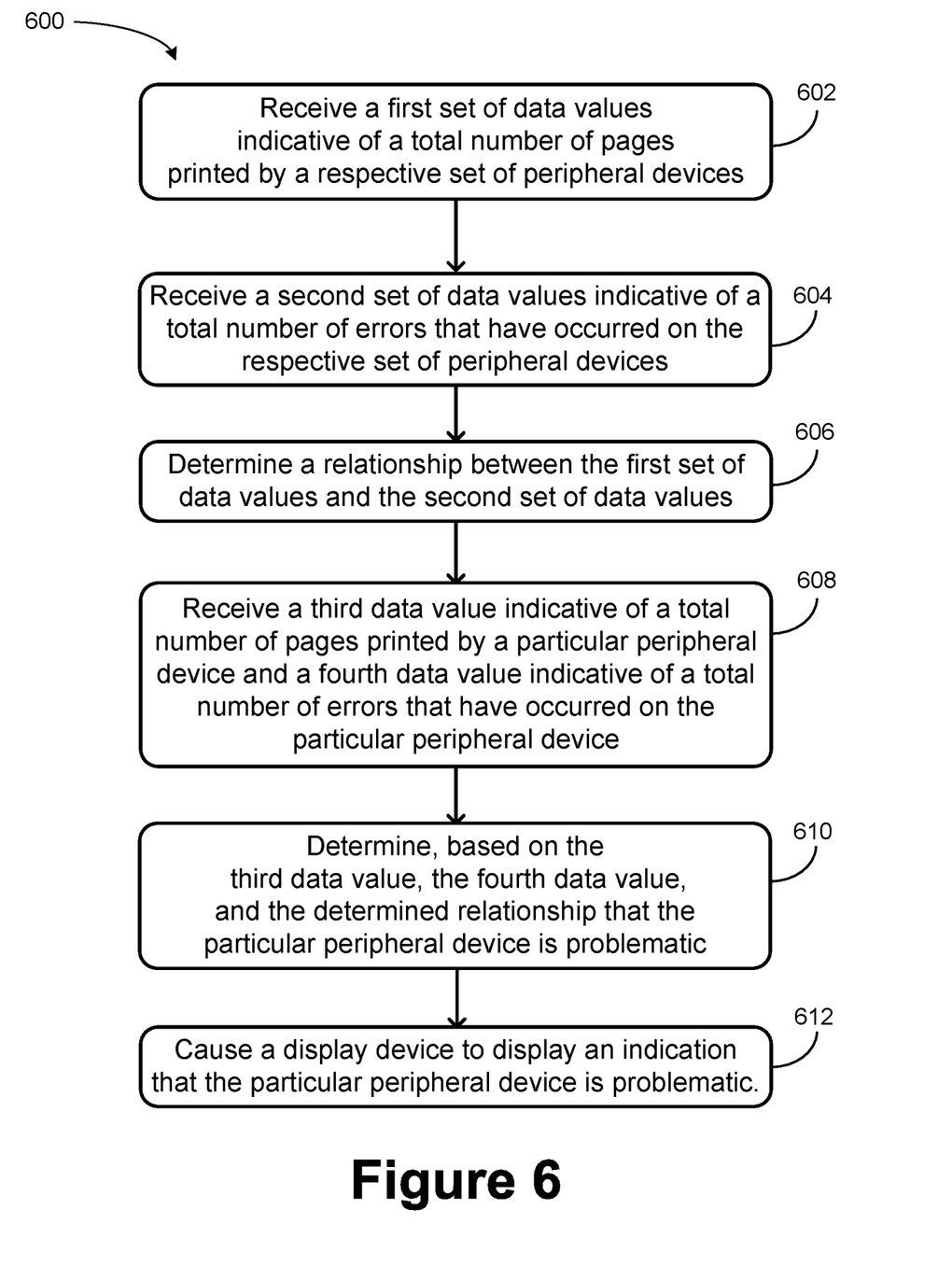
FIG. 6 is a flowchart illustrating a method, according to an example embodiment.

FIG. 6 is a flowchart illustrating a method 600, according to an example embodiment. More specifically, the method 600 depicts operations for determining whether a peripheral device is problematic. The method 600 may be performed on image forming apparatus 100, or on a variety of other devices, such as computing devices, mobile devices, and client devices, among other possible devices. The following method 600 describes an example of comparing error rates for explanatory purposes. It should be understood that any other comparative metric may be determined, analyzed, and displayed using the operations disclosed herein.

At step 602, the method 600 involves receiving a first set of data values indicative of a total number of pages printed by a respective set of peripheral devices. As described above, the set of data values may be logged entries of printing operations from which the total number of pages printed by the respective set of peripheral devices can be derived. In some embodiments, the first set of data values may indicate maintained counters of a number of pages printed for each of the peripheral devices in the set.

At step 604, the method 600 involves receiving a second set of data values indicative of a total number of errors that have occurred on the respective set of peripheral devices. Similarly to step 602, the set of data values may be logged entries of printing errors or faults from which the total number of errors that have occurred on the respective set of peripheral devices can be derived. In some embodiments, the second set of data values may indicate maintained counters of a number of errors that have occurred for each of the peripheral devices in the set. The total number of errors may include a variety of errors (e.g. paper jams, low ink or toner errors, etc.), or may be indicative of a particular error.

Figure 7:
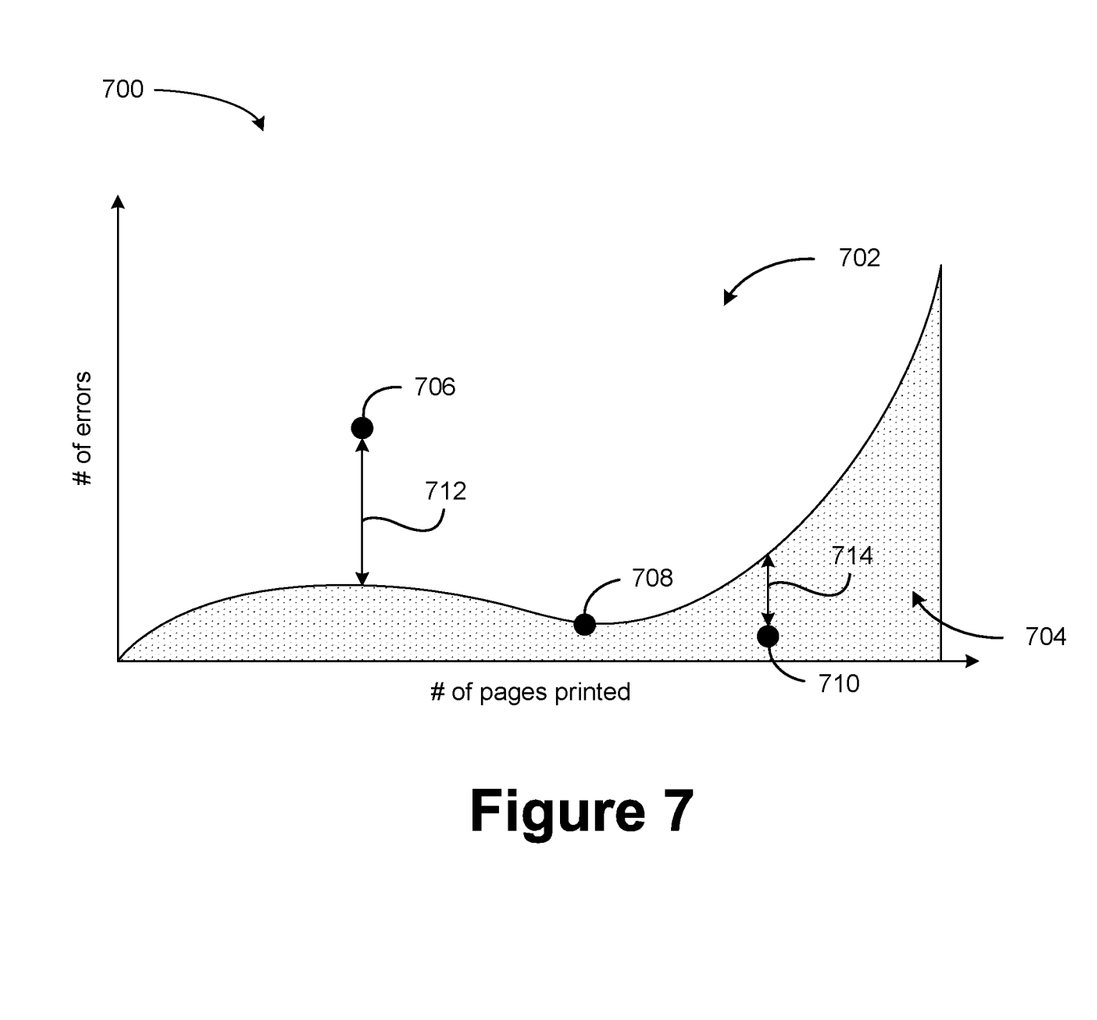
FIG. 7 is a graphical representation of a comparison metric, according to an example embodiment.

At step 606, the method 600 involves determining a relationship between the first set of data values and the second set of data values. Step 606 may involve utilizing a mathematical and/or statistical regression analysis to determine how the second set of data values depends upon the first set of variables. This relationship may be in the form of a polynomial function having any number of degrees that approximates a mathematical relation between the two sets of data. Determining such a polynomial function might involve performing curve fitting techniques that approximate a function that closely correlates the first set of data values to the second set of data values. The resulting determined relationship correlates the number of pages printed to the number of errors occurred, such that it can be used to infer an expected number of errors that should have occurred on a peripheral device given a specified number of pages printed. An example illustration of a relationship between a number of pages printed and a number of errors occurred is shown in FIG. 7, which is described in further detail below.

At step 608, the method 600 involves receiving a third data value indicative of a total number of pages printed by a particular peripheral device and a fourth data value indicative of a total number of errors that have occurred on the particular printing device. In other words, the third data value and the fourth data value are representative of counters for the particular printing device. In some instances, the third and fourth data values may be included in or derived from the first and second sets of data values. In other instances, step 608 involves receiving logged entries for the particular printing device and calculating the total number of pages printed and total number of errors occurred from those logged entries.

At step 610, the method 600 involves determining, based on the third data value, the fourth data value, and the determined relationship that the particular peripheral device is problematic. Step 610 may involve determining an expected number of printed pages using the determined relationship and the total number of printed pages for the particular peripheral device. The determined relationship may be configured or parameterized such that an expected number of pages can be calculated using an input number of pages.

The calculated expected number of errors occurred may then be compared to the total number of errors that actually occurred (i.e. the third data value). This comparison may be used as a basis for determining whether the particular peripheral device is problematic. In some embodiments, this involves determining a difference between the expected number of errors that have occurred and the total number of errors that actually occurred; in other words, the difference between an expected error rate and the actual error rate. This difference may be referred to herein as the "residual value," which represents an extent of deviation of the performance of the particular peripheral device to a "normal" or expected performance for the peripheral device.

If the residual value exceeds a threshold value, the peripheral device may be deemed as problematic. Stated in another way, if the number of errors that have occurred over the total number of pages printed for the particular peripheral device exceeds an expected number of errors that should have occurred for that number of pages printed (i.e. the actual error rate exceeds the expected or "normal" error rate), then that peripheral device may be considered problematic.

Alternatively, if the residual value is less than or equal to a threshold value, the peripheral device may be deemed "healthy" or otherwise operating at an expected level. Stated in another way, if the number of errors that have occurred over the total number of pages printed for the particular peripheral device is less than or equal to an expected number of errors that should have occurred for that number of pages printed (i.e. the actual error rate is less than or equal to the expected or "normal" error rate), then that peripheral device may be considered operationally healthy or nominal.

At step 612, the method 600 involves causing a display device to display an indication that the particular peripheral device is problematic. The display device may be a display unit of a computing device, a mobile device, or an operation panel of a peripheral device. The indication may be text and/or graphics that convey that the peripheral device is operationally "unhealthy" and signals to a user or serviceperson that the peripheral device may require inspection or service.

Note that "problematic" may generally refer to a peripheral device that has at least one error rate or other measurable aspect that deviates from an expected or "normal" operation for that peripheral device. Other error rates or metrics may be utilized in determining that a peripheral device is problematic. Furthermore, the extent to which a peripheral device is problematic may also be determined and displayed at step 612.

FIG. 7 is a graphical representation 700 of a relationship between a number of errors and number of pages printed (i.e. an error rate), according to an example embodiment. The relationship depicted in FIG. 7 may have been determined using above-described techniques. For instance, the depicted relationship might have been determined based on a set of data values indicative of the number of pages printed and number of errors occurred for a plurality of peripheral devices.

On this example graphical representation 700, three data points have been overlaid: data point 706, data point 708, and data point 710. The number of errors represented by data point 706 exceeds the expected number of errors for the number of pages printed in data point 706 by a residual value of 712. Data point 708 represents a sample data point from the data used to determine the depicted relationship. The number of errors represented by data point 710 is less than the expected number of errors for the number of pages printed in data point 710 by a residual value of 714.

The depicted relationship divides the plot into two areas: a problematic area 702, and a healthy area 704. Data points that exist within the problematic area 702 have a higher error rate than an expected error rate specified by the depicted relationship. In some cases, such as when a data point lies a threshold distance from the specified relationship (i.e. the residual value exceeds a threshold), the peripheral device associated with that data point may be considered problematic. Thus, the data point 706 may represent an error rate associated with a problematic peripheral device. If residual value 712 exceeds a threshold value, the peripheral device associated with data point 706 is considered problematic. However, if the residual value 712 is less than the threshold value but still lies above the depicted relationship within the problematic area 702, the peripheral device associated with data point 706 may be flagged as potentially problematic.

Data points that exist within the healthy area 704 have a lower error rate than the expected error rate specified by the depicted relationship. In some cases, the residual value 714 may not be calculated because a peripheral device that operates with an error rate that is less than the expected rate is likely to be deemed "healthy." Thus, the data point 710 may represent an error rate associated with a healthy peripheral device. If the residual value 714 (or the absolute value of the residual value 714) exceeds some threshold value, the peripheral device associated with data point 710 may be deemed exceptionally healthy and performing better than expected. However, if the residual value 714 (or the absolute value of the residual value 714) is less than or equal to some threshold value, the peripheral device associated with data point 710 may be deemed nominal or otherwise considered to be operating normally.

Note that the graphical depiction 700 of the relationship shown in FIG. 7 is provided for explanatory purposes. The values associated with the data points and the relationship may not necessarily correlate to a particular set of values. Additionally, other metrics may be compared in a similar manner to the number of pages printed and the number of errors in order to identify whether or not a peripheral device is problematic.

V. Variations

In some instances, the visual data display graphs generated using the operations and techniques of the present application might take on forms other than bar graphs. Other shapes divided in any manner may also be utilized to convey the comparison between two or more values. Shading, colors, or other dynamic styling may also be used to convey the comparison and provide meaningful information.

In some cases, the visual data display graphs may display information for purposes other than identifying problematic peripheral devices. A user or serviceperson may wish to understand the operational history of a particular peripheral device to determine, for example, the workload variance during certain times of the day, certain days of the week, or certain months out of the year. Such information may be useful for planning purposes, design purposes, or office organization purposes, among other possible purposes.

VI. Conclusion

The above detailed description describes various features and functions of the disclosed systems, devices, and methods with reference to the accompanying figures. While various aspects and embodiments have been disclosed herein, other aspects and embodiments will be apparent. The various aspects and embodiments disclosed herein are for purposes of illustration and are not intended to be limiting, with the true scope being indicated by the following claims.

What is claimed is:

1. A non-transitory computer-readable medium having instructions stored thereon that, upon execution by at least one processor, perform the following operations:
    receiving a first plurality of data values indicative of a total number of pages printed by a respective plurality of peripheral devices;
    receiving a second plurality of data values indicative of a total number of errors that have occurred on the respective plurality of peripheral devices;
    determining a relationship between the first plurality of data values and the second plurality of data values;
    receiving a third data value indicative of a total number of pages printed by a particular peripheral device and a fourth data value indicative of a total number of errors that have occurred on the particular peripheral device;
    determining that the particular peripheral device is problematic based on the third data value, the fourth data value, and the determined relationship;
    causing a display device to display an indication that the particular peripheral device is problematic; and
    flagging the particular peripheral device as problematic, to thereby signal at least one of required inspection or service.

2. The non-transitory computer-readable medium of claim 1, wherein determining that the particular peripheral device is problematic comprises:
    determining an expected number of printed pages based on the fourth data value and the determined relationship;
    determining a residual value as a difference between the expected number of printed pages and the third data value, wherein the residual value is indicative of an extent of deviation of the third data value from the expected number of printed pages; and
    based on the residual value exceeding a threshold value, determining that the particular peripheral device is problematic.

3. The non-transitory computer-readable medium of claim 2, wherein the operations further comprise:
    generating a bar graph with at least a first bar representative of the expected number of printed pages and a second bar representative of the third data value, wherein the first bar and second bar have proportional lengths; and
    causing the display device to display the bar graph.

4. The non-transitory computer-readable medium of claim 3, wherein the display device is coupled to a mobile computing device, and wherein causing the display device to display the bar graph comprises:
    transmitting data representative of the bar graph to the mobile computing device; and
    rendering the bar graph on the display device of the mobile computing device.

5. The non-transitory computer-readable medium of claim 2, wherein the threshold value is a first threshold value, and wherein the operations further comprise:
    based on the residual value being less than a second threshold value, preventing the display device from displaying the bar graph.

6. The non-transitory computer-readable medium of claim 3, wherein the third data value comprises at least two sub-values, and wherein the operations further comprise:
    segmenting the second bar into at least two portions corresponding to the at least two sub-values, wherein each portion is proportional in length to its respective sub-value, and wherein a sum of the at least two sub-values is equal to the third data value.

* * * * *